(12) United States Patent
Takehara

(10) Patent No.: US 6,831,554 B2
(45) Date of Patent: Dec. 14, 2004

(54) ABNORMALITY DETECTION METHOD AND PROTECTION APPARATUS

(75) Inventor: Nobuyoshi Takehara, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/059,170

(22) Filed: Jan. 31, 2002

(65) Prior Publication Data

US 2002/0135496 A1 Sep. 26, 2002

(30) Foreign Application Priority Data

| Feb. 1, 2001 | (JP) | ........................................ 2001-025838 |
| Jan. 30, 2002 | (JP) | ........................................ 2002-021755 |

(51) Int. Cl.[7] .............................................. G08B 23/00
(52) U.S. Cl. ........................ 340/501; 340/584; 374/43; 374/141
(58) Field of Search ................................ 340/501, 584, 340/14.6, 384.5; 374/141, 43, 44

(56) References Cited

U.S. PATENT DOCUMENTS

| | | | |
|---|---|---|---|
| 5,115,225 A | * 5/1992 | Dao et al. ..................... | 340/584 |
| 5,227,610 A | 7/1993 | Schultheis et al. .......... | 219/449 |
| 5,302,022 A | * 4/1994 | Huang et al. ................. | 374/44 |
| 5,473,644 A | 12/1995 | Yasuoka et al. ............. | 376/254 |
| 5,548,504 A | 8/1996 | Takehara ...................... | 363/65 |
| 5,592,074 A | 1/1997 | Takehara ...................... | 363/131 |
| 5,621,300 A | 4/1997 | Sato et al. ...................... | 320/5 |
| 5,669,987 A | 9/1997 | Takehara et al. ............. | 136/244 |
| 5,714,869 A | 2/1998 | Tamechika et al. ........... | 320/30 |
| 5,751,133 A | 5/1998 | Sato et al. ..................... | 320/13 |
| 5,838,187 A | * 11/1998 | Embree ....................... | 327/512 |
| 5,869,956 A | 2/1999 | Nagao et al. ................ | 323/299 |
| 5,892,354 A | 4/1999 | Nagao et al. ................ | 323/299 |
| 5,923,158 A | 7/1999 | Kurokami et al. .......... | 323/299 |
| 5,955,885 A | 9/1999 | Kurokami et al. .......... | 324/426 |
| 5,986,354 A | 11/1999 | Nagao et al. ................. | 307/64 |
| 6,039,471 A | * 3/2000 | Wyland ........................ | 374/43 |
| 6,092,926 A | * 7/2000 | Still et al. .................... | 374/141 |
| 6,101,073 A | 8/2000 | Takehara ...................... | 361/42 |
| 6,169,442 B1 | * 1/2001 | Meehan et al. .............. | 327/513 |
| 6,278,052 B1 | 8/2001 | Takehara et al. ............. | 136/244 |
| 6,320,769 B2 | 11/2001 | Kurokami et al. ........ | 363/56.03 |
| 2001/0026576 A1 | * 10/2001 | Beer et al. ................... | 374/141 |

FOREIGN PATENT DOCUMENTS

| | | |
|---|---|---|
| DE | 264774 | 2/1989 |
| DE | 264774 A1 | 2/1989 |
| DE | 19702126 A1 | 4/1998 |
| DE | 19702126 | 4/1998 |
| JP | 59-60611 | 4/1984 |
| JP | 63-35967 | 3/1988 |
| JP | 3-253219 | 11/1991 |
| JP | 5-60617 | 3/1993 |
| JP | 08-95648 | 4/1996 |
| JP | 08-286552 | 11/1996 |
| JP | 2000-32653 | 1/2000 |

OTHER PUBLICATIONS

International Business Machines Corporation, RD 431148 entitled "Shared Power Distribution Thermal Protection," Research Disclosure, No. 431, Mar., 2000, pp. 562–563.

\* cited by examiner

*Primary Examiner*—Daniel J. Wu
*Assistant Examiner*—Son Tang
(74) *Attorney, Agent, or Firm*—Fitzpatrick, Cella, Harper & Scinto

(57) ABSTRACT

A general abnormal heating detection method in an electronic device is limited to an object to be monitored, and cannot cope with heating of an object of which overheating is unexpected. To correct this problem, temperature data are acquired from a plurality of temperature sensors distributed in the device to be protected, the parameter indicating temperature distribution pattern in the device is calculated on the basis of the acquired temperature data, and an alarm signal is output when the calculated parameter indicating temperature distribution pattern deviates from a predetermined reference.

2 Claims, 9 Drawing Sheets

ABNORMALITY DETECTION METHOD AND PROTECTION APPARATUS

FIELD OF THE INVENTION

The present invention relates to an abnormality detection method and protection apparatus and, more particularly, to a technique for detecting any abnormal heating of a device.

BACKGROUND OF THE INVENTION

Electric devices take various protections against overheat. FIG. 1 shows a typical circuit for detecting any abnormal heating, and FIG. 2 is a flow chart showing its operation.

A determination circuit 2 detects the temperature of a heating member 3 from the output of a temperature sensor 4 attached to the heating member 3 in a device 1 to be protected and monitored (S1). If the circuit 2 detects a temperature that has exceeded a predetermined temperature (S2), it outputs an alarm signal 5 (S3).

For example, Japanese Patent Laid-Open No. 2000-32653 discloses an example in which an element (temperature sensor 4), the resistance of which increases with increasing temperature, and the heating member 3 are arranged adjacent to each other. Japanese Utility Model Laid-Open No. 63-35967 discloses a method of attaching a plurality of temperature sensors at symmetric positions with respect to an object to be monitored, and detecting any abnormal heating based on the difference between the right and left temperatures of the object to be monitored, which are detected by these temperature sensors. Furthermore, Japanese Patent Laid-Open No. 5-60617 discloses a method for measuring the temperature distribution of an object to be monitored using an infrared camera, and detecting any abnormal heating.

The abnormal heating detection method shown in FIGS. 1 and 2, and the methods disclosed in Japanese Patent Laid-Open No. 2000-32653 and Japanese Utility Model Laid-Open No. 63-35967 are limited to specific objects to be monitored, and cannot cope with heating of an object of which overheating is unexpected. That is, it is a common practice to set a temperature sensor in the vicinity of a member, which is expected to generate heat, and to take heating protection when the temperature of that member exceeds a predetermined value. However, abnormal heating of a member which is not expected to generate heat may be neglected.

On the other hand, the method of detecting any abnormal heating from the temperature distribution (Japanese Patent Laid-Open No. 5-60617) does not limit an object to be monitored. However, it is difficult- in terms of hardware and cost to monitor the interior of an electric device used in a house without any dead angles using an infrared camera.

SUMMARY OF THE INVENTION

The present invention has been made to solve the aforementioned problems individually or together, and has as its object to detect abnormal heating at an arbitrary position in a device.

In order to achieve the above object, a preferred embodiment of the present invention discloses a method of detecting temperature abnormality of a device, comprising the steps of: acquiring temperature data from a plurality of temperature sensors distributed in the device; acquiring a parameter indicating a temperature distribution pattern in the device on the basis of the acquired temperature data; and outputting, when the acquired parameter deviates from a predetermined parameter indicating a temperature distribution pattern, a signal indicating temperature abnormality of the device.

Also, a preferred embodiment of the present invention discloses a protection apparatus comprising: a plurality of temperature sensors distributed in a device to be protected; an acquisition section, arranged to acquire temperature data from the plurality of temperature sensors, and acquire a parameter indicating a temperature distribution pattern in the device on the basis of the acquired temperature data; and a determiner, arranged to output, when the acquired parameter deviates from a predetermined parameter indicating a temperature distribution pattern, a signal indicating temperature abnormality of the device.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

An abnormal heating detection method according to an embodiment of the present invention will be described in detail hereinafter with reference to the accompanying drawings.

Figure 1:
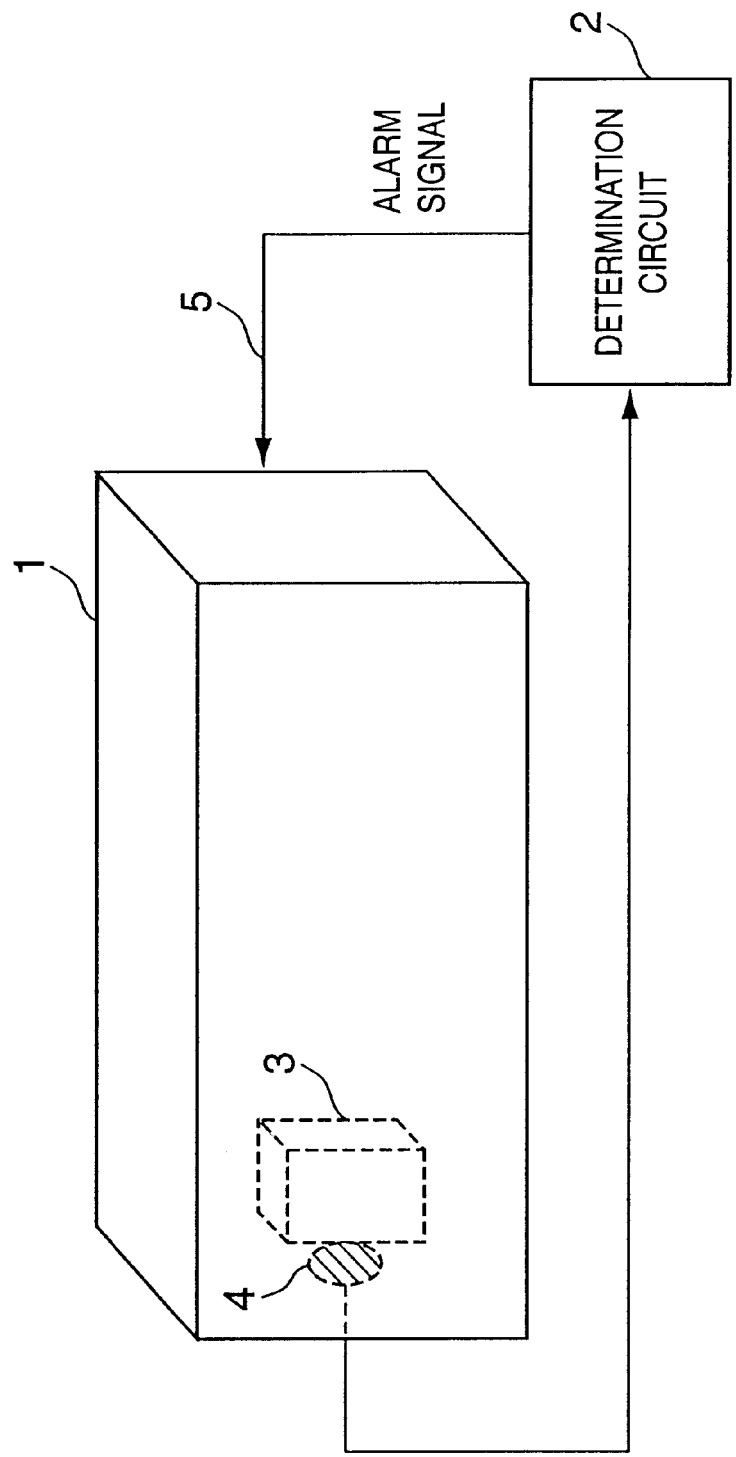
FIG. 1 is a diagram showing a typical circuit for detecting any abnormal heating.
Figure 2:
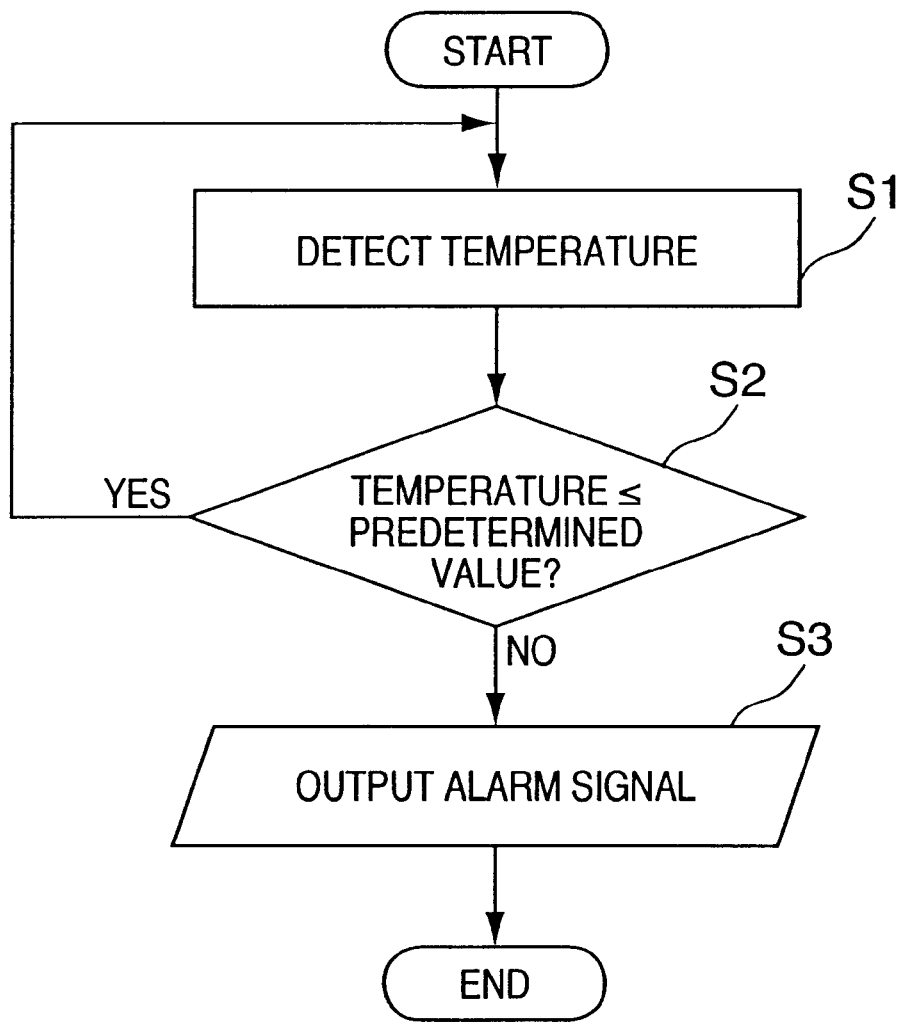
FIG. 2 is a flow chart showing the operation of the typical circuit for detecting any abnormal heating.
Figure 3:
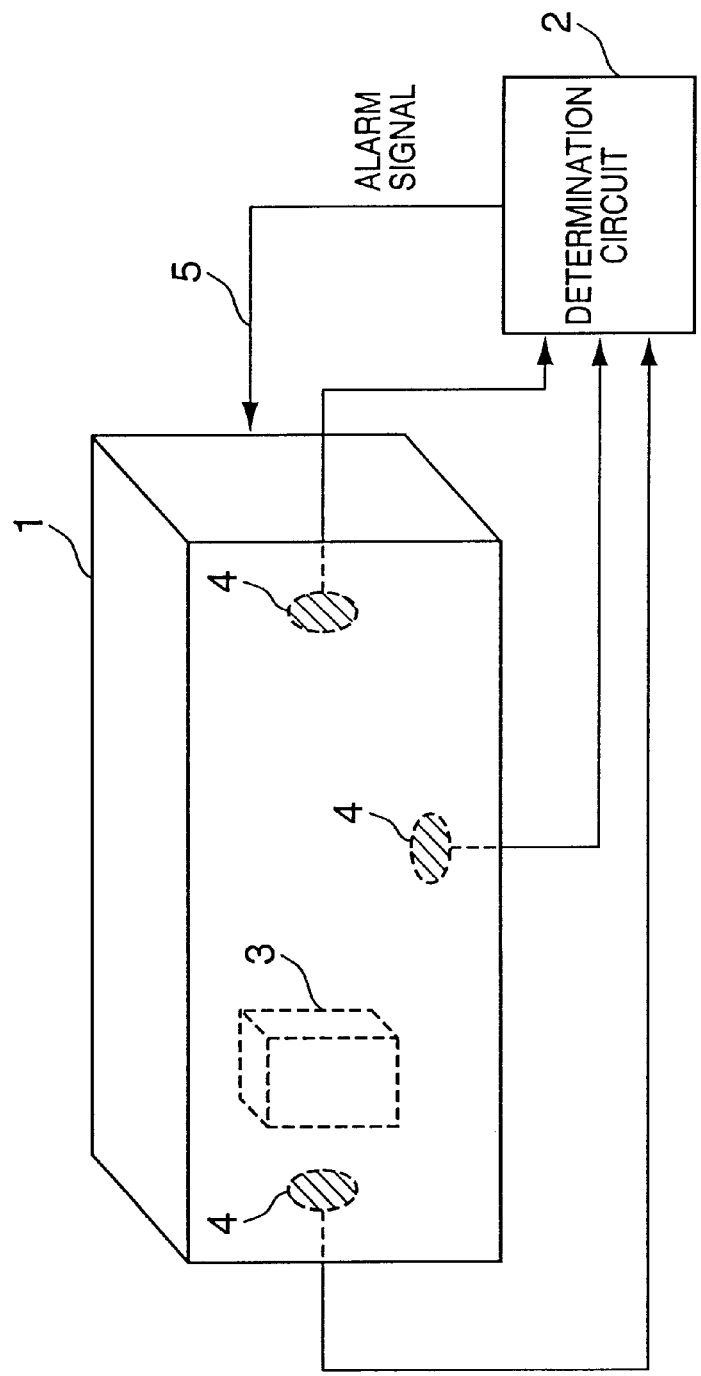
FIG. 3 is a diagram showing an abnormal heating detection method according to an embodiment of the present invention.

FIG. 3 is a diagram for explaining the abnormal heating detection method of this embodiment.

A plurality of temperature sensors 4 are arranged inside a device 1 to be monitored. The respective temperature sensors 4 are distributed inside the object to be monitored, and some of them may be arranged in the vicinity of a heating member 3.

Each temperature sensor 4 may use a thermocouple, heat sensitive resistor, platinum resistance thermometer, or the like. As a simple sensor, a sensor which utilizes the temperature characteristics of a forward voltage drop of a diode or transistor, a temperature detection IC that incorporates a diode and the like, and so forth may be used. In this embodiment, a sensor that can measure temperature in an analog manner is preferably used.

A determination circuit 2, which normally comprises a microcomputer and the like, checks based on the measurement results obtained from the respective temperature sensors 4 if a temperature distribution has a good pattern, and outputs an alarm signal 5 based on the checking result. Note that the temperature distribution pattern is normally analyzed using curve fitting by polynomial approximation, and such scheme is preferably used in this embodiment. Also, various other schemes such as a scheme that uses the temperature difference among sensors, and the like may be used.

Since the object of this embodiment is "to protect against abnormal heating" but is not to obtain a spatial temperature distribution, the temperature distribution pattern in this embodiment need not strictly express the spatial absolute position and the temperature at that point. Hence, the temperature sensors 4 need not be arranged at equal intervals, and some temperature sensor 4 may be arranged in the vicinity of the heating member 3 or the respective temperature sensors 4 may be randomly arranged. It is important to arrange a plurality of temperature sensors 4 at different positions inside the device 1 to be monitored.

Needless to say, discrimination for the temperature absolute value as in the prior art can be combined with abnormal heating detection of this embodiment.

Figure 4:
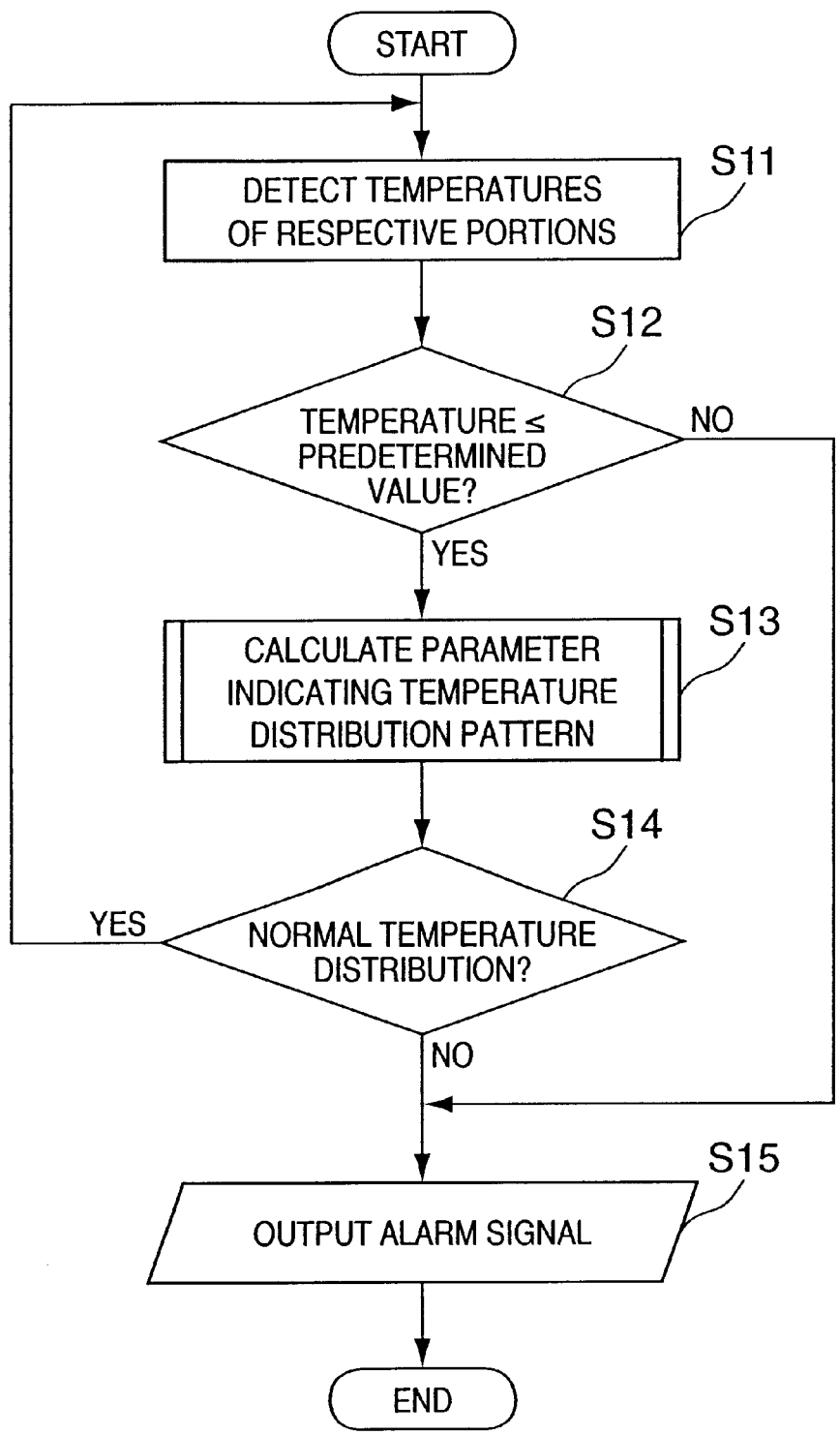
FIG. 4 is a flow chart showing the abnormal heating detection method according to the embodiment of the present invention.

FIG. 4 is a flow chart showing the abnormal heating detection method of this embodiment.

The determination circuit 2 acquires the temperature values of all the temperature sensors 4 (S11), and outputs an alarm signal 5 (S15) if the temperature sensor 4 that exhibits a temperature exceeding a predetermined temperature is found (S12). If the temperature values of all the temperature sensors 4 are equal to or lower than the predetermined value (S12), the determination circuit 2 calculates parameters indicating the temperature distribution pattern based on these temperature values (S13). If the difference between that temperature distribution pattern and a reference pattern is equal to or larger than a predetermined value, the determination circuit 2 determines that the temperature distribution is abnormal (S14), and outputs an alarm signal 5 (S15).

In this way, a characteristic feature of this embodiment lies in that the plurality of temperature sensors 4 distributed inside the device 1 detect the temperature distribution pattern inside the device 1, and it is checked if the temperature distribution has any abnormality. In other words, this embodiment is characterized by discriminating the detection values of the plurality of temperature sensors 4 together in place of discriminating them individually. Hence, abnormal heating at an unexpected position (member) can be detected, and the reliability of heating protection can be improved.

FIRST EMBODIMENT

A basic arrangement for discriminating the temperature distribution pattern by comparing coefficients of a "power function" obtained by curve fitting with reference coefficients will be explained below.

Device to be Protected and Monitored

Figure 5:
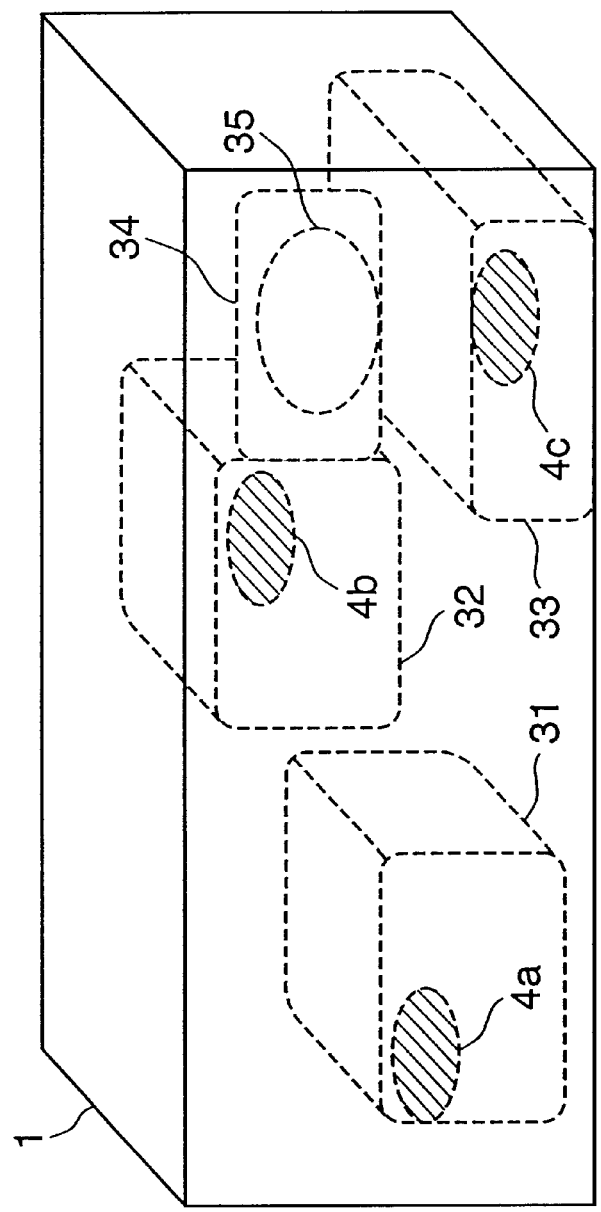
FIG. 5 is a perspective view for explaining a device to be protected and monitored.

FIG. 5 is a view for explaining the device 1 to be protected and monitored. The device 1 is an uninterruptible power supply which comprises a transformer 31, a rectifier & inverter main circuit 32, a storage battery 33, and a control circuit 34. FIG. 5 shows the positional relationship of the principal constituting members inside a housing. Note that power semiconductor elements used in the rectifier & inverter main circuit 32 are attached to a common heat sink.

Layout of Temperature Sensors

Since all the members other than the control circuit 34 generate heat considerably, temperature sensors 4a to 4c are attached, as shown in FIG. 5. Each temperature sensor 4 uses a dedicated IC for linearly converting a temperature into a voltage. As such temperature measurement IC, for example, LM35 (National Semiconductor Corporation) is commercially available. This IC outputs a voltage of 25 mV for a temperature of 25° C., and if that output is input to a one-chip CPU with an A/D converter, temperature measurement can be easily done. In the first embodiment, the output from the IC is amplified, and is then input to the one-chip CPU to constitute the determination circuit 2.

Determine Reference Coefficients

A prescribed load is connected to the device 1 (uninterruptible power supply shown in FIG. 5) at an ambient temperature of 25° C. to normally operate the device. After the temperature inside the device 1 has reached a steady state, the temperatures of the respective temperature sensors 4 are measured. As a result, the sensor 4a exhibited 65° C.; 4b, 40° C.; and 4c, 40° C.

Based on these measurement results, curve fitting of a quadratic function is executed. Note that it is a common practice to set the order of the function to be a value obtained by subtracting 1 from the number of measurement points. However, since calculations become more complicated with increasing order, the order may be reduced using, e.g., the method of least squares. As described above, since it is not significant to obtain a spatially strict temperature distribution in the first embodiment, curve fitting is made using ID=0 to 2 assigned to the temperature sensors 4a to 4c as the numerical values on the x-axis (abscissa) to calculate pattern parameters (reference coefficients R0 to R2). More specifically, the relationship between a measured temperature T and x (=ID) is defined by:

$$T = R0 + R1 \times x + R2 \times x^2 \tag{1}$$

Since three temperatures T are measured, simultaneous equations with three unknowns are obtained, and reference coefficients R0 to R2 are obtained by solving them. Since a constant term R0 is considered as a parameter that represents the ambient temperature, it need not be used in the following discrimination. The reference coefficients obtained by the aforementioned method were R=65, R1=−37.5, and R2=12.5.

Discriminate Abnormal Temperature at Position Separated from Temperature Sensor Experimentally, a miniature bulb (consumption power is around 5 W) was arranged in the vicinity of the control circuit 34 (a region 35 in FIG. 5) and was turned on so as to simulate abnormal heating at an unexpected position. As a result, temperature rises were observed in the temperature sensors 4b and 4c around the control circuit 34: the sensor 4a exhibited 65° C.; 4b, 47° C.; and 4c, 42° C. When coefficients A0 to A2 corresponding to the reference coefficients R0 to R2 were calculated based on these results in the same procedure as described above, A0=65, A1=−24.5, and A2=6.5.

By removing constant terms R0 and A0 from the reference coefficients Rk and coefficients Ak upon abnormal heating (simulation), a difference E using:

$$E = \sum_{k=1}^{n} |Rk - Ak| = |R2 - A2| + |R1 - A1| \qquad (2)$$

yields "19".

Hence, in order to detect abnormal heating (about 5 W) in the above experiment, a discrimination threshold value is set to be 19 or less.

Figure 6:
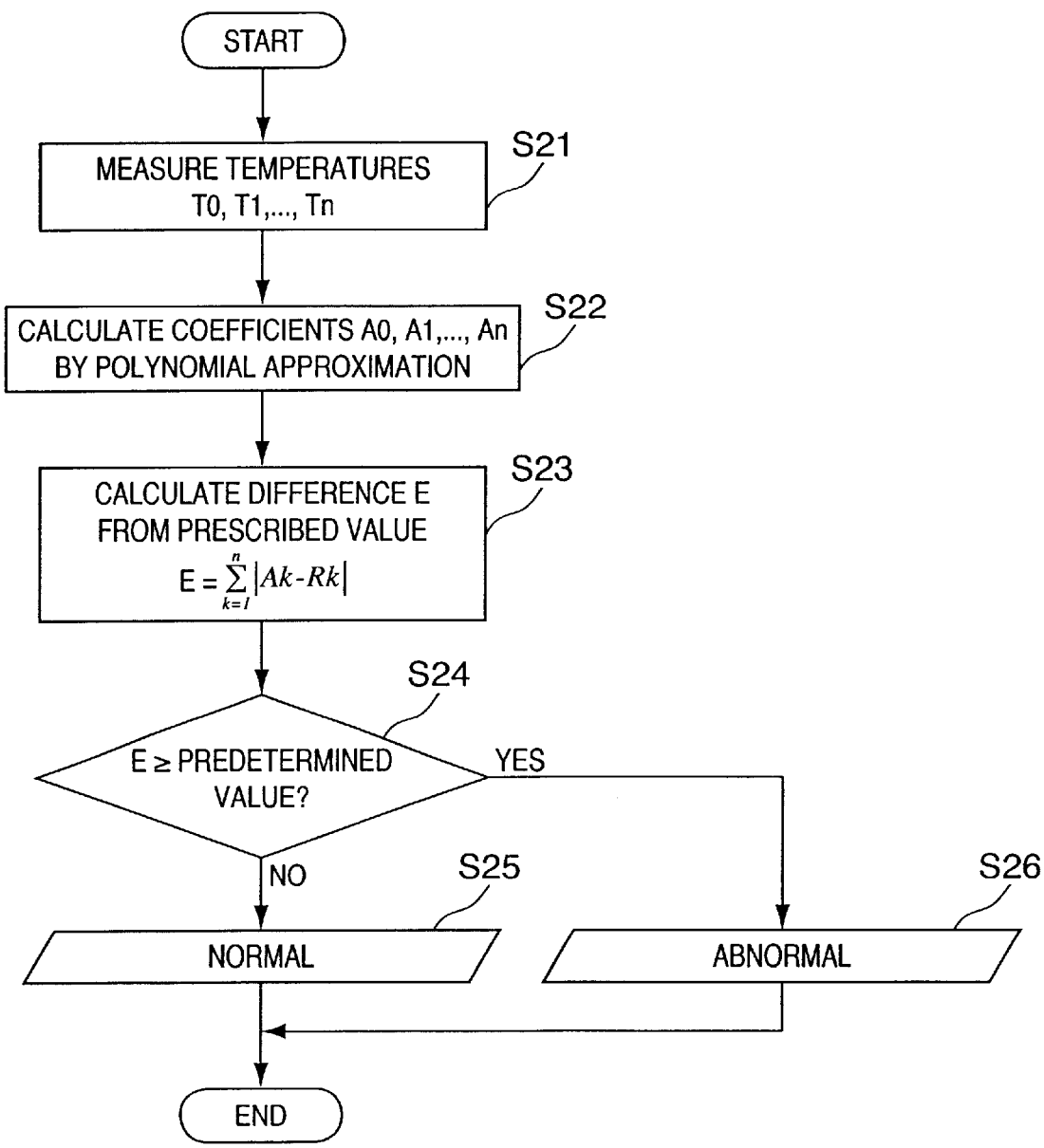
FIG. 6 is a flow chart showing an abnormal heating detection sequence in the first embodiment.

FIG. 6 is a flow chart showing the abnormal heating detection sequence in the first embodiment, which corresponds to the process in step S13 in the flow chart shown in FIG. 4.

The determination circuit 2 measures temperatures T0, T1, ..., Tn of the temperature sensors 4 (S21), and calculates coefficients A0, A1, ..., An by aforementioned polynomial approximation (S22). The determination circuit 2 calculates the difference E from the reference coefficients Rk (S23), and checks if the difference E is equal to or larger than a discrimination threshold value (S24).

If abnormal heating of about 5 W has occurred around the control circuit 34, the difference E is around 19. Hence, if the discrimination threshold value is set to be 19 or less, abnormal heating of about 5 W around the control circuit 34 can be detected.

Hence, if the difference E is equal to or larger than the discrimination threshold value, the circuit 2 returns information indicating abnormality in step S26; otherwise, the circuit 2 returns information indicating normal in step S25.

In this way, any abnormal heating at an unexpected position where no temperature sensor is arranged can be adequately detected.

Note that the gist of the present invention is "to calculate parameters that represent the temperature distribution pattern from temperature data detected by a plurality of temperature sensors, and to discriminate abnormal heating based on those parameters". Hence, an effect of detecting any unexpected abnormal heating of a portion where no temperature sensor is attached in the device can be obtained. Therefore, various modifications can be made within the spirit and scope of the present invention.

SECOND EMBODIMENT

An embodiment with lower cost will be explained below. In the second embodiment, a diode is used as each temperature sensor. This sensor uses a forward voltage drop across a PN junction or temperature dependence of a Zener voltage, and measures temperature based on a voltage across the two terminals of the diode by supplying a constant current to the diode. If the diode is used, temperature detection can be done with low cost.

Figure 7:
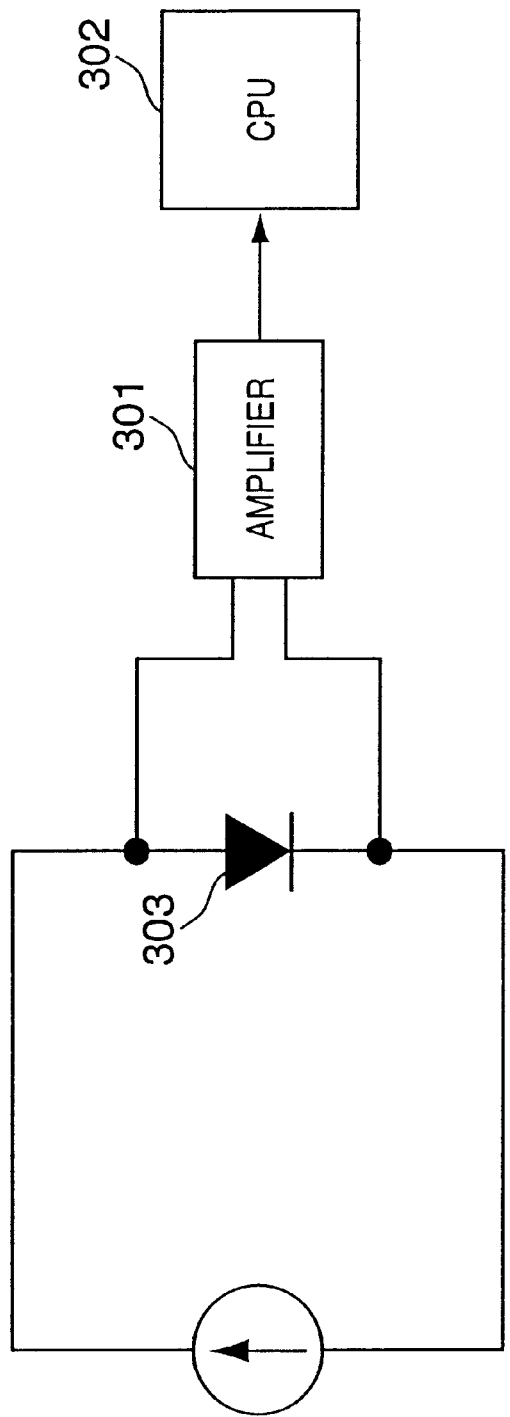
FIG. 7 is a diagram showing an example of a measurement circuit.

FIG. 7 shows an example of a measurement circuit. A voltage across the two terminals of a diode 303 to which a constant current is supplied is amplified by an amplifier 301, and is supplied to a one-chip microcomputer 302 with an A/D converter. Note that the temperature value required in the second embodiment need not be that measured by a thermometer but can be a physical quantity which depends on temperature, and its linearity need not be considered. That is, the pattern parameters of the temperature distribution can be calculated from these information quantities.

Note that the following description is premised on the same device and layout of temperature sensors as in the first embodiment. Discrimination threshold values for the temperatures detected by the individual temperature sensors are determined in consideration of the upper limit use temperature of 40° C. of the device.

Determine Reference Coefficients

A prescribed load is connected to the device 1 (uninterruptible power supply shown in FIG. 5) at an ambient temperature of 25° C. to normally operate the device. After the temperature inside the device 1 has reached a steady state, the temperatures of the respective temperature sensors 4 are measured. As a result, the sensor 4a exhibited 65° C.; 4b, 40° C.; and 4c, 40° C. Note that the measurement values themselves are voltage values which depend on temperature, but the following description will be given while converting the voltage values into temperature values for the sake of easy understanding.

In the second embodiment, the sum of absolute values of temperature differences from a given temperature sensor (e.g., 4a) as reference T0 is used as a pattern parameter D of the temperature distribution, which is given by:

$$D = \sum_{k=1}^{n} |Tk - T0| = |Tb - Ta| + |Tc - Ta| \qquad (3)$$

Note that a reference pattern parameter R obtained by substituting the aforementioned measurement values in equation (3) is "50".

At an ambient temperature of 40° C. as the upper limit use temperature of the device 1, a prescribed load is connected to the device 1 to normally operate the device. After the temperature inside the device 1 has reached a steady state, the temperatures of the respective temperature sensors 4 are measured. As a result, the sensor 4a exhibited 80° C.; 4b, 55° C.; and 4c, 55° C. The pattern parameter D="50" remains unchanged, but the measured temperatures have risen in correspondence with the ambient temperature rise.

Hence, abnormal heating discrimination threshold values corresponding to the temperature sensors 4a to 4c are respectively set to be 95° C., 70° C., and 70° C. to prevent discrimination errors even at the ambient temperature of 40° C. When abnormal heating is discriminated using the temperatures detected by the individual temperature sensors, abnormal heating is checked using these discrimination threshold values. Therefore, relatively large discrimination threshold values must be set in consideration of the ambient temperature rise.

Discriminate Abnormal Temperature at Position Separated from Temperature Sensor

At an ambient temperature of 40° C., as in the first embodiment, experimentally, a miniature bulb (consumption power is around 5 W) was arranged in the vicinity of the control circuit 34 (a region 35 in FIG. 5) and was turned on so as to simulate abnormal heating at an unexpected position. As a result, temperature rises were observed in the temperature sensors 4b and 4c around the control circuit 34: the sensor 4a exhibited 80° C.; 4b, 62° C.; and 4c, 57° C.

Since the abnormal heating discrimination threshold values are respectively 95° C., 70° C., and 70° C., the detection results of the individual temperature sensors do not exceed their discrimination threshold values, and no abnormal heating is detected. On the other hand, the pattern parameter D based on equation (3) is "41", and the difference E from the pattern parameter D=50 in a normal state is "9". Therefore, if a discrimination threshold value is set to be 9 or less, abnormal heating can be detected. When the ambient temperature is lowered to 25° C. while the miniature bulb (consumption power is around 5 W) is arranged near the control circuit 34 and is turned on, the temperature sensor 4a exhibits 65° C.; 4b, 47° C.; and 4c, 42° C. In this case, the pattern parameter D="41" remains unchanged, and is not influenced by a change in ambient temperature.

Figure 8:
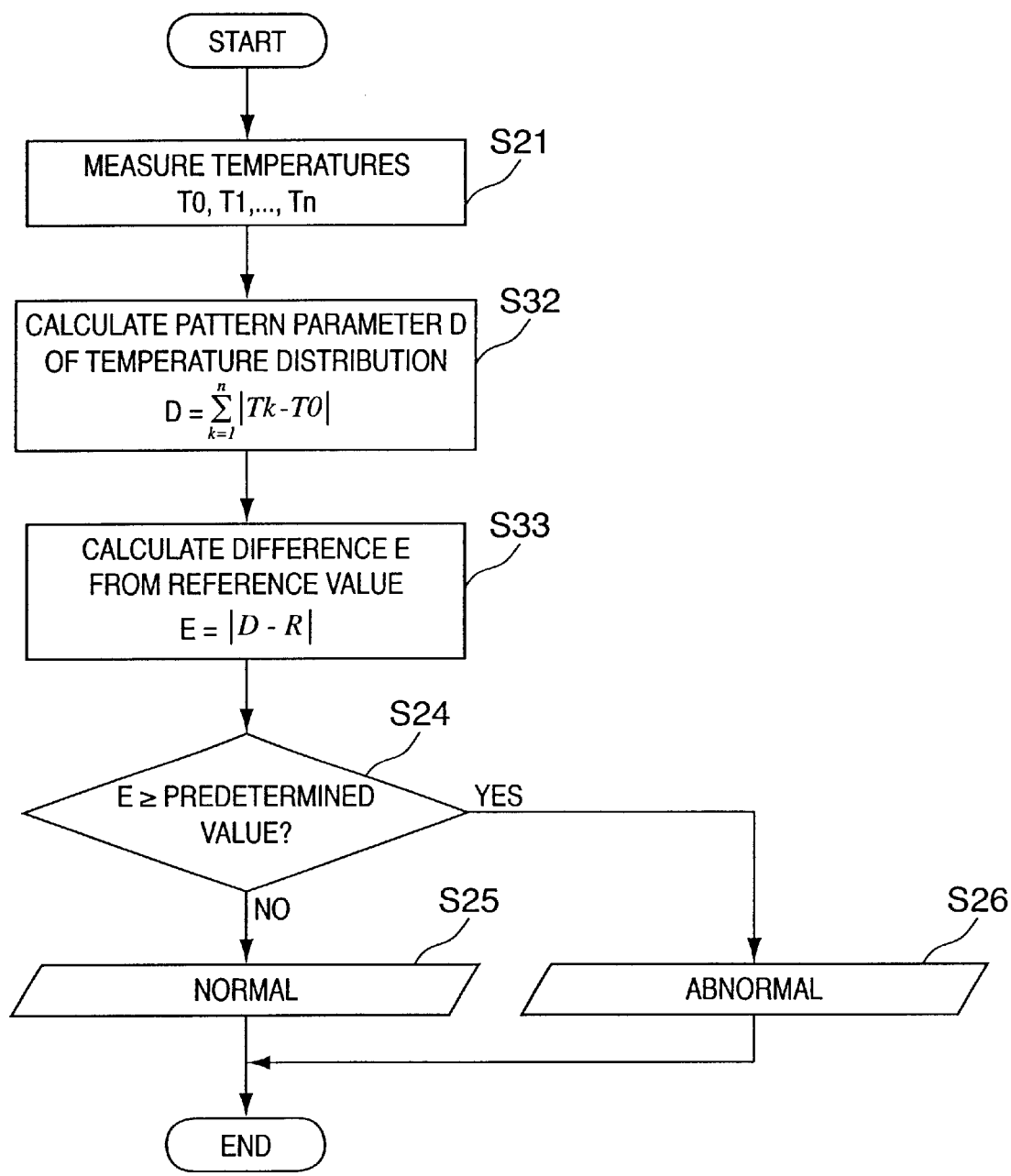
FIG. 8 is a flow chart showing an abnormal heating detection sequence in the second embodiment.

FIG. 8 is a flow chart showing the abnormal heating detection sequence in the second embodiment, which is a process corresponding to step S13 in the flow chart shown in FIG. 4. Note that the same step numbers in FIG. 8 denote those which execute the same processes as in the flow chart shown in FIG. 6.

The determination circuit 2 measures temperatures T0, T1, . . . , Tn of the temperature sensors 4 (S21), and calculates the pattern parameter D using equation (3) (S32). The determination circuit 2 calculates the difference E from the reference coefficient R (S33) and checks if the difference E is equal to or larger than a discrimination threshold value (S24).

If abnormal heating of about 5 W has occurred around the control circuit 34, the difference E is around 9. Hence, if the discrimination threshold value is set to be 9 or less, abnormal heating of about 5 W around the control circuit 34 can be detected.

Hence, if the difference E is equal to or larger than the discrimination threshold value, the circuit 2 returns information indicating abnormality in step S26; otherwise, the circuit 2 returns information indicating normal in step S25.

In this way, when the temperature distribution pattern is used in discrimination of abnormal heating, abnormal heating can be discriminated without being influenced by the ambient temperature. Since the temperature distribution pattern itself is not influenced by the ambient temperature, a discrimination threshold value added with a margin in consideration of the influence of the ambient temperature need not be set compared to a case wherein abnormal heating is detected by a temperature sensor alone. In other words, the method of detecting abnormal heating on the basis of the temperature distribution pattern is more sensitive than a case wherein abnormal heating is detected by a temperature sensor alone.

THIRD EMBODIMENT

The third embodiment will explain that the aforementioned abnormal heating detection method can also detect any abnormality of the setting direction of the device 1.

Figure 9:
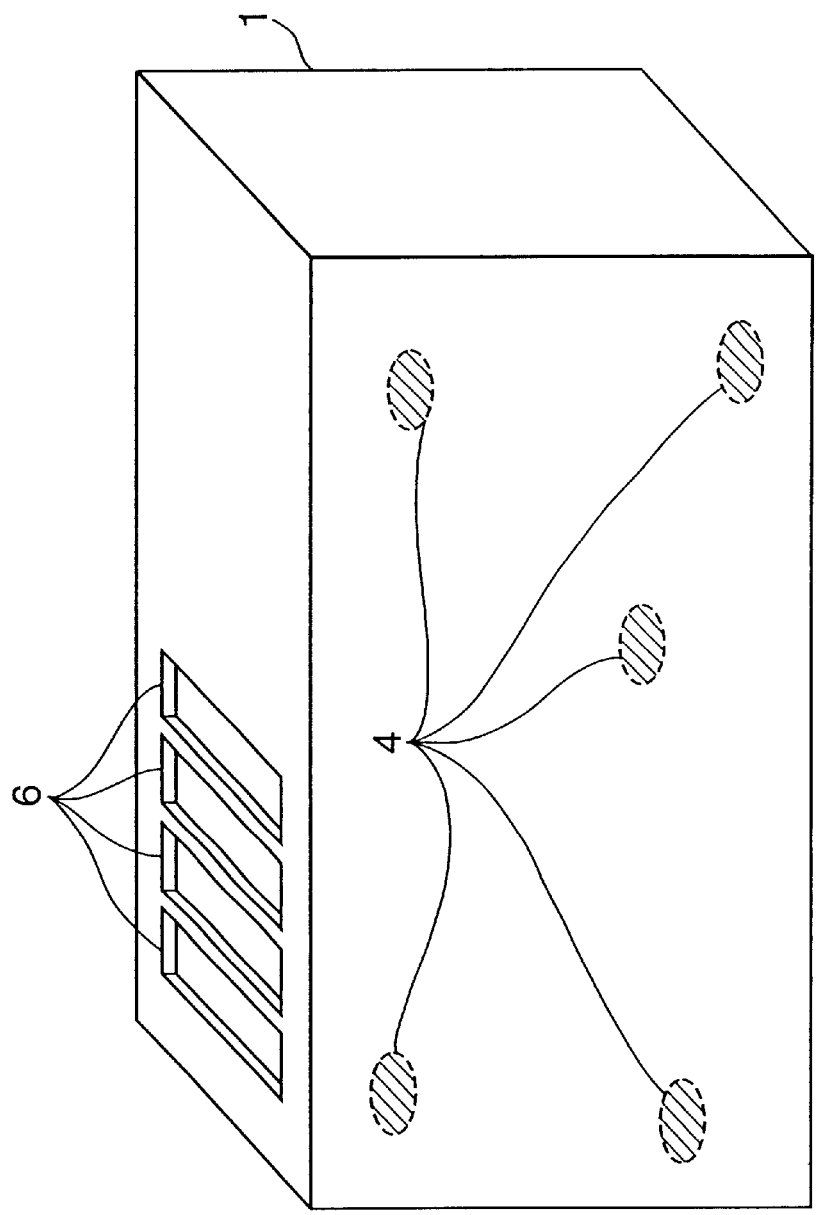
FIG. 9 is a perspective view showing a device to be protected and monitored, and an example of the layout of temperature sensors in the third embodiment.

The device 1 to be protected and monitored is an inverter connected to a commercial power system used in a solar light power generator. As the temperature sensors 4, five thermocouples are distributed in the device 1, as shown in FIG. 9. Reference numeral 6 in FIG. 9 denotes ventilation holes, which are located on the upper surface of the device 1 when the device 1 is set normally.

As in the above embodiments, the temperatures of the respective temperature sensors 4 are measured in a reference state, and a pattern parameter S is calculated by:

$$S = \sum_{k=1}^{n-1} (T_{k+1} - T_k)^2 \quad (4)$$

$$= (T_5 - T_4)^2 + (T_4 - T_3)^2 + (T_3 - T_2)^2 + (T_2 - T_1)^2$$

The pattern parameter S of the third embodiment is the sum of squares of the temperature differences between neighboring temperature sensors 4. Squares are not indispensable, but simple differences mean use of only the first and last terms, i.e., T5 and T1 in equation (4), and some nonlinear elements (e.g., powers) are preferably included in a formula.

In the third embodiment, the direction of the inverter is rotated through 90° without changing the ambient temperature from the reference state, so that the ventilation holes 6 are located on the side surface of the device 1. In this way, since the directions of the heat sink and ventilation holes 6 are different from a normal state, heat builds up inside the device 1 and a different pattern parameter S of the temperature distribution is confirmed.

In this manner, even slight abnormality such as an abnormal setting direction of the device 1 can be sharply detected. Of course, even when the device 1 is set normally, if the ventilation holes 6 are closed or a clearance above the ventilation holes is small, such abnormality appears as a change in pattern parameter S. Hence, a ventilation problem of the device 1 can be detected.

As described above, according to this embodiment, the temperature distribution or pattern in the device is estimated from the temperatures measured by a plurality of temperature sensors distributed inside the device to be protected, and when the distribution or pattern has deviated from a predetermined reference state, abnormal heating is determined. In this way, the following excellent effects can be obtained, and industrial applicability is high.

(1) Abnormal heating at a position where no temperature sensor is arranged can be detected.

(2) Abnormal heating can be detected with high sensitivity without being influenced by the ambient temperature of the device.

In the above embodiments, abnormal heating is simulated around the control circuit, and a discrimination threshold value is set based on a change in pattern parameter caused as a result of such simulation. If abnormal heating is likely to occur at a plurality of positions, abnormal heating may be simulated at each of these positions, and a discrimination threshold value may be set based on pattern parameters obtained from these simulation results. If abnormal heating is likely to occur at a plurality of positions, and the position where abnormal heating has occurred is to be detected, the temperatures detected by the temperature sensors 4 may be weighted in correspondence with positions to calculate a pattern parameter.

Also, heating is simulated in a device to acquire a temperature distribution pattern in advance, and temperature other than the measurement points can be estimated by comparing the temperature distribution pattern acquired in advance, and the acquired temperature distribution. In such case, a plurality of temperature distribution patterns are preferably acquired in correspondence with various heating positions and heating temperatures.

FOURTH EMBODIMENT

The fourth embodiment will explain that the aforementioned abnormal heating is detected based on arrangement of temperature sensors distributed inside a device 1, and difference between temperature data acquired from the sensors and reference data.

Simulated abnormal heating was occurred in a region 35 in the neighborhood of a control circuit 34 shown in FIG. 5. As a result, temperature rises were observed in the temperature sensors 4b and 4c around the control circuit 34, and temperatures of the temperature sensors 4b and 4c exceeded predetermined reference values. On the other hand, since the temperature sensor 4a is away from the control circuit 34, the temperature of it was not exceed predetermined reference value.

If a position of abnormal heating is obscure, a position of a source of the abnormal heating will be estimated in the neighborhood of the temperature sensor that indicates the temperature exceeding or deviating the reference value. Further, degree of the abnormal heating will be estimated from difference between the temperature of the temperature sensor and the reference value. Accordingly, the abnormal heating will be detected based on the arrangement of temperature sensors that indicate the temperatures exceeding or deviating the reference values and the degree of difference between the temperatures of the temperature sensors and the reference values. When the difference is small and positions of the sensors, each of which indicates the temperature exceeding or deviating the reference value, are concentrated, the position of the abnormal heating will be estimated in the concentrated portion.

The reference value is preferable to set to each of the temperature sensors 4a, 4b and 4c, because the temperatures of the sensors 4a, 4b and 4c are different from each other after the device 1 has reached a steady state, generally. Further, the reference value corresponding to the temperature sensor arranged to a higher temperature position in the steady state is set to a high, thus a detection error of the abnormal heating can be prevented.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A method of detecting temperature abnormality of a device, comprising the steps of:

acquiring temperature data from a plurality of temperature sensors distributed in the device;

acquiring a parameter indicating a temperature distribution pattern in the device on the basis of the acquired temperature data, wherein the parameter is calculated based on coefficients of a polynomial obtained by curve approximation of the temperature data; and outputting, when the acquired parameter deviates from a predetermined parameter indicating a temperature distribution pattern, a signal indicating temperature abnormality of the device.

2. A protection apparatus comprising:

a plurality of temperature sensors distributed in a device to be protected;

an acquisition section, arranged to acquire temperature data from said plurality of temperature sensors, and acquire a parameter indicating a temperature distribution pattern in the device on the basis of the acquired temperature data, wherein the parameter is calculated based on coefficients of a polynomial obtained by curve approximation of the temperature data; and a determiner, arranged to output, when the acquired parameter deviates from a predetermined parameter indicating a temperature distribution pattern, a signal indicating temperature abnormality of the device.

* * * * *

UNITED STATES PATENT AND TRADEMARK OFFICE
CERTIFICATE OF CORRECTION

PATENT NO. : 6,831,554 B2
DATED : December 14, 2004
INVENTOR(S) : Nobuyoshi Takehara It is certified that error appears in the above-identified patent and that said Letters Patent is hereby corrected as shown below:

Column 1,
Line 51, "difficult-" should read -- difficult --.

Column 4,
Line 47, "R=65," should read -- R0=65, --.

Signed and Sealed this

Thirty-first Day of January, 2006

JON W. DUDAS
*Director of the United States Patent and Trademark Office*